United States Patent [19]

Lugosi et al.

[11] Patent Number: 5,157,966
[45] Date of Patent: Oct. 27, 1992

[54] TRANSMISSION SPEED SENSOR

[75] Inventors: Robert Lugosi, Canton; James A. Hilby, Watertown, both of Conn.

[73] Assignee: The Torrington Company, Torrington, Conn.

[21] Appl. No.: 639,382

[22] Filed: Jan. 11, 1991

Related U.S. Application Data

[63] Continuation-in-part of Ser. No. 481,494, Feb. 20, 1990, abandoned.

[51] Int. Cl.⁵ .................................. G01M 15/00
[52] U.S. Cl. .................................................. 73/118.1
[58] Field of Search ............... 73/118.1, 493, 494, 73/518–520; 324/173, 174, 207.25; 310/168; 384/448, 477, 119

[56] References Cited

U.S. PATENT DOCUMENTS

| | | | |
|---|---|---|---|
| 3,653,471 | 4/1972 | Burckhardt et al. | 73/519 |
| 3,769,533 | 10/1973 | Pauwels | 310/168 |
| 4,186,609 | 2/1980 | Baermann | 73/519 |
| 4,667,156 | 5/1987 | Machino et al. | 73/494 |
| 4,724,935 | 2/1988 | Roper et al. | 73/493 |
| 4,751,459 | 6/1988 | Stupak, Jr. | 73/519 |
| 4,862,028 | 8/1989 | Dierker, Jr. et al. | 324/174 |
| 4,875,785 | 10/1989 | Santos et al. | 384/446 |
| 4,884,901 | 12/1989 | Harsdorff | 384/448 |
| 4,915,512 | 4/1990 | Hilby et al. | 384/448 |

FOREIGN PATENT DOCUMENTS 1947971  4/1971  Fed. Rep. of Germany ........ 73/519

*Primary Examiner*—Robert Raevis
*Attorney, Agent, or Firm*—John C. Bigler; Michael H. Minns

[57] ABSTRACT

A transmission shaft speed sensor which comprises a Hall-effect or variable reluctance detector and a means for generating a magnetic field which is integrated into a thrust bearing assembly positioned about the differential casing of an automobile transmission, thereby avoiding structural modification of the transmission itself.

8 Claims, 2 Drawing Sheets

TRANSMISSION SPEED SENSOR

This application is a continuation-in-part of application Ser. No. 481,494, filed Feb. 20, 1990, now abandoned.

BACKGROUND OF THE INVENTION

In an attempt to minimize the redesigning of standard automotive transmissions so as to incorporate a reliable speed sensor, the present inventor has developed a novel transmission speed sensor which requires little or no extra space within the transmission housing.

While there have been significant mechanical improvements in engine, suspension and drive train technology, the past decade can be characterized by an electronic revolution in the automotive industry.

Electronic control units (ECU) amass information from sensors and command the action of many vital functions in today's automobile. There are four major categories in which electronic controls have made substantial inroads: (1) engine, (2) transmission, (3) suspension, and (4) anti-lock braking/traction control. In all of these cases the signals of the rotational motion or position change of components are fed to the ECU, which compares them to a calculated or mapped value ideal for the operational conditions. The ECU then initiates changes in the controlled function in order to minimize deviation from ideal conditions. For this scheme to work effectively, high reliability, good resolution and economic sensor systems are required.

In order to sense motion/position in an automobile, there are four distinct systems that have evolved: (1) passive or variable reluctance sensors, (2) active sensors, such as Hall-effect sensors, (3) optical sensors, and (4) accelerometers. Variable reluctance sensors have been used predominantly in anti-lock braking systems (ABS) for wheel speed sensing and in automatic transmission output speed sensing. Hall-effect sensors have been used mostly in ignition systems, while optical sensors and accelerators are used in suspension control systems.

This invention relates primarily to sensors used to detect the output speed of automobile transmissions. Currently, variable reluctance sensors are used to sense transmission output speed. These sensors typically measure the change in magnetic field strength as a ferromagnetic exciter ring or toothed wheel passes a detector. That is, the moving teeth of the exciter ring change the magnetic flux in the vicinity of a variable reluctance detector, i.e., a coil and magnet, and pulses of electrical current are induced. The output from the coil is sinusoidal, with an frequency proportional to the speed of the exciter ring. The frequency of the detector signal is used to calculate the rotational speed of the transmission.

U.S. Pat. No. 3,716,788 to Nishida, describes a conventional variable reluctance sensor which is added to a wheel bearing assembly to measure axle speed. A toothed rotor is formed on a revolvable inner bearing ring opposite a toothed stator fixed to a stationary outer bearing ring. The bearing outer ring also supports the magnetic coil pickup or detector which produces a voltage in accordance with the changes in magnetic flux induced by alignment of the rotor and stator teeth during rotation. The frequency of the alternating current produced is in proportion to the rotational speed of the axle.

A similar type speed sensor is disclosed in U.S. Pat. No. 3,826,933 to Anselmino. This speed sensor has a magnetic pickup coil or detector secured to the stationary ring of a bearing while a wheel having ferromagnetic teeth is secured to the rotatable ring of the roller bearing.

The problem associated with using variable reluctance sensors to measure the output speed of a transmission involves the current practice of providing a separate exciter ring or toothed wheel with multiple teeth positioned on the transmission output shaft. These variable reluctance sensors require the addition of a separate exciter ring to the transmission which takes up precious space, increases product cost and increases the overall weight of the transmission. Typically, the space required for conventional variable reluctance sensor systems is not available unless the sensor is specifically designed into an entirely new transmission. For example, in a typical rear wheel driven passenger car, the adaptation of a sensor within a transmission must take into consideration the added space for an exciter ring at the expense of some other important design considerations, such as overall size.

Another problem associated with variable reluctance sensors using separate exciter rings is that movement by the exciter ring may cause inaccurate magnetic field measurements.

Any sensor that minimizes system mechanical redesign, meets performance requirements, reliability and cost requirements, is considered extremely desirable by automobile designers. Therefore, the present inventor undertook the task of developing a transmission speed sensor which requires little or no extra space in the transmission, is highly reliable, and is cost effective.

The present invention involves the application of a redesigned integral thrust bearing assembly with a variable reluctance sensor and a thrust bearing assembly with a Hall-effect sensor. Although thrust bearing assemblies have been known to utilize Hall-effect and variable reluctance sensors as evidenced in U.S. Pat. No. 4,875,785 to Santos et al., the present inventor has uniquely redesigned the thrust bearing assembly of an automobile transmission to incorporate either a Hall-effect or integral variable reluctance sensor.

The present invention is applicable to any power transmission device which uses thrust bearings. This includes transfer cases for four wheel drive capability, differentials, torque convertors and power take-off units. The present invention is also applicable to input shafts and intermediate shafts within any power transmission device.

Additional advantages of the present invention shall become apparent as described below.

SUMMARY OF THE INVENTION

In one aspect of the present invention, this is accomplished by providing a transmission speed sensor wherein an encoder to provide a permanent magnetic field is incorporated into an elongated portion of a thrust bearing thrust plate. A sensor element is located opposite the encoder.

A novel transmission speed sensor comprising either a Hall-effect sensor or a variable reluctance sensor positioned about a thrust bearing assembly of an automobile transmission.

The thrust bearing assembly is typically mounted about the differential casing which rotates at the same speed as the transmission output shaft and includes a thrust bearing disposed between a first thrust plate and a second thrust plate. The second thrust plate is relatively rotatable with respect to the first thrust plate. Moreover, the second thrust plate is elongated such that it can provide a raceway for the thrust bearing and also support at a radial portion thereof a means for permanently providing a magnetic field. A sensor element or detector is disposed opposite the magnetic means in order to detect the magnetic field. The magnetic means is preferably a plurality of permanently magnetized magnetic pole segments disposed about the entire circumference of a radial portion of the second thrust plate. The sensor element or detector used to detect the magnetic field in accordance with this preferred embodiment is a Hall-effect detector.

Alternatively, the second thrust plate may be elongated and have equally spaced slots disposed about a radial portion thereof. The slotted thrust plate is positioned opposite a sensor element or detector which is capable of detecting a change in magnetic field induced by the slotted thrust plate; whereby use of a separate toothed wheel is eliminated. The second thrust plate typically comprises a ferromagnetic material. The sensor element or detector is either a variable reluctance detector or Eddy current detector.

Optionally, the teeth located about the slotted end of the second thrust plate can be angled away from the detector in order to increase the magnetic field.

The invention as well as its many advantages may be further understood by reference to the following detailed description and drawings in which like parts have been given like numbers.

DETAILED DESCRIPTION OF THE PREFERRED EMBODIMENTS

Figure 1:
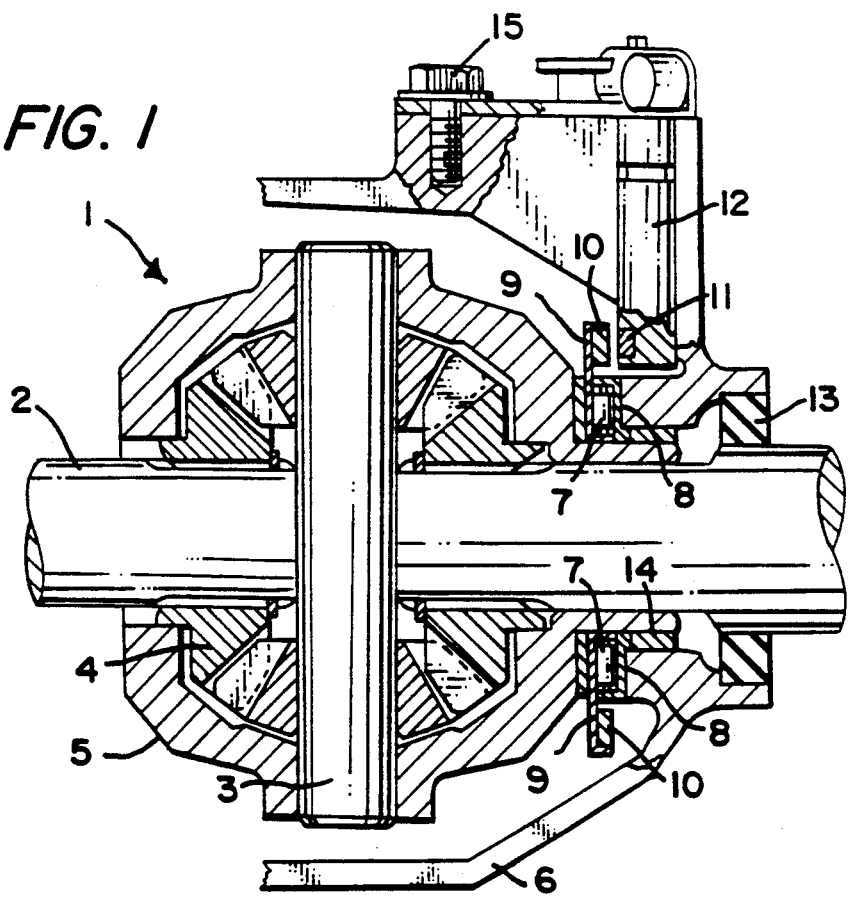
FIG. 1 is a schematic cross-sectional view of a transmission device having a thrust bearing assembly which contains a means for generating a magnetic field which is detected by a Hall-effect detector in accordance with the present invention.

The novel transmission output speed sensors according to the present invention require insertion of the appropriate detector and integration of a means for generating a magnetic field into a needle roller thrust bearing assembly positioned about the differential casing of an automobile transmission, thereby avoiding structural modification of the transmission itself.

Using a Hall-effect sensor to measure the output speed of a transmission required the present inventor to alter the rotating thrust plate or inner race of a thrust bearing assembly to accommodate a multipole magnet. A sensor probe is then replaceably mounted within the transmission housing. The design of the sensor probe allows the maintenance of good dimensional tolerance over the "air gap". The sensor probe houses a Hall chip giving rise to a "near zero" speed sensing capability and digital output. Since needle roller thrust bearing assemblies, in many cases, are standard components of automatic transmissions, installation of a Hall-effect sensor requires minimal redesign of the transmission and absolutely no lengthwise axial dimensional change.

The Hall-effect sensor operates as follows. As each alternating polarity segment passes the sensor element or detector, the polarity and strength of the magnetic field causes the detector to produce electric signals. This voltage signal can be further processed by circuits to produce an output signal indicating an incremental unit of angular displacement. The incremental angular displacement unit is equal to the number of degrees of arc in each pole segment.

Depending on the signal conditioning electronic circuitry of the detector, the output signal can be an analog or digital signal. Changes in magnitude of the output signal indicate incremental angular displacement. The angular displacement output signal can be further processed by integrated circuitry in the detector to generate a position signal, a speed signal or an acceleration signal. Magnetizing the rotating member into a large number of segments allows very high resolution.

Optionally, the present invention provides for the use of a variable reluctance sensor to measure the output speed of a transmission. Use of a variable reluctance sensor according to the present invention necessitates the alteration of the rotating thrust plate or inner race of a thrust bearing assembly to include slots disposed about a radial portion of the rotating thrust plate. The slotted thrust plate is formed from a ferromagnetic material so that it is capable of changing a permanent magnetic field. A variable reluctance detector, i.e., a magnet and coil, is replaceably mounted within the transmission housing. Again, since the thrust bearing assembly is a standard component of automatic transmissions at the output position, installation of a variable reluctance detector with a slotted thrust plate requires minimal redesign of the transmission and absolutely no lengthwise axial dimensional change.

The variable reluctance sensor according to the present invention operates as follows. The sensor element or detector typically measures the change in magnetic field strength as a ferromagnetic slotted thrust plate passes the detector. That is, the slotted configuration of the thrust plate results in a lower field strength at the slot and a higher field strength at the teeth. The frequency of the detector signal is used to calculate the rotational speed of a slotted thrust plate attached to a transmission shaft.

Another embodiment provides for the angling of the teeth about the slotted thrust plate. This is believed to enhance the field strength generated by the slotted thrust plate, thereby increasing detection accuracy.

Referring to the drawings and more particularly to Fig. 1, a thrust bearing sensor is used to detect the output speed of a transmission device 1 comprising a transmission shaft 2, a differential member 3, differential gears 4, a differential casing 5, a transmission housing 6, and a thrust bearing assembly disposed about differential casing 5. The thrust bearing assembly includes a needle roller thrust bearing 7 disposed between a first thrust plate 8 and a second thrust plate 9 which is relatively rotatable with respect to first thrust plate 8. Second thrust plate 9 being elongated such that it provides a raceway for thrust bearing 7, while also being capable of supporting at a radial portion thereof a means 10 for permanently providing a magnetic field. A detector 11 housed within a replaceable sensor probe 12 is disposed opposite magnetic means 10 for detecting the magnetic field generated as magnetic means 10 passes detector 11.

Detector 11 is preferably a Hall-effect detector. Hall-effect detector 11 is housed in sensor probe 12 such that it is positioned within the magnetic field generated by magnetic means 10.

Magnetic means 10 for permanently providing a magnetic field is typically a plurality of permanently magnetized magnetic pole segments disposed about the entire circumference of a radial portion of second thrust plate 9. Each magnetic pole segment has a North pole and a South pole, with the segments being arranged so that each pole is between two poles of opposite polarity. Magnetic means 10 is preferably a ring formed of ferromagnetic material which fits within thrust plate 9, thereby avoiding the need for a separate magnetic means element and the redesigning of transmission 1.

Transmission 1 also includes seal 13 and sleeve bearing 14. Sensor probe 12 is replaceably mounted within transmission housing 6 via securing means or screw 15.

Figure 2:
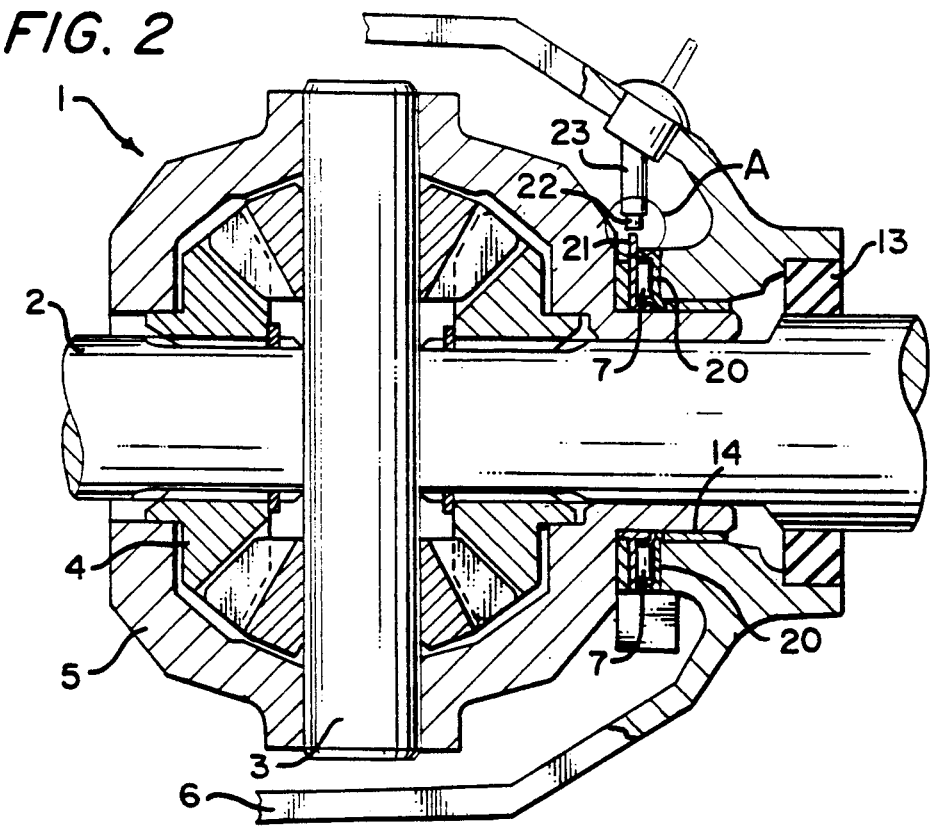
FIG. 2 is a schematic cross-sectional view of another embodiment according to the present invention wherein a slotted thrust plate of a thrust bearing assembly induces a change in the magnetic field which is detected by a variable reluctance detector.

FIG. 2 depicts another embodiment according to the present invention wherein a variable reluctance thrust bearing sensor is used to detect the output speed of a transmission device 1. Transmission 1 comprises a transmission output shaft 2, a differential member 3, differential gears 4, a differential casing 5, a transmission housing 6, and a thrust bearing assembly disposed about differential casing 5. The thrust bearing assembly includes a thrust bearing 7 disposed between a first thrust plate 20 and a second thrust plate 21 which is relatively rotatable with respect to first thrust plate 20. Second thrust plate 21 being elongated and having slots disposed about a radial portion thereof. A sensor element or detector 22 is disposed on sensor probe 23 and positioned opposite the slots of second thrust plate 21 for detecting a magnetic field generated therefrom; whereby use of a separate toothed wheel is eliminated.

Figure 4:
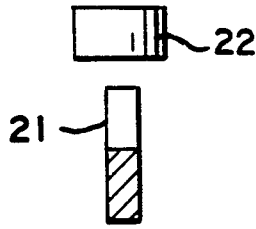
FIG. 4 is an enlargement of area A in FIG. 2 depicting a variable reluctance detector and a slotted thrust plate.
Figure 5:
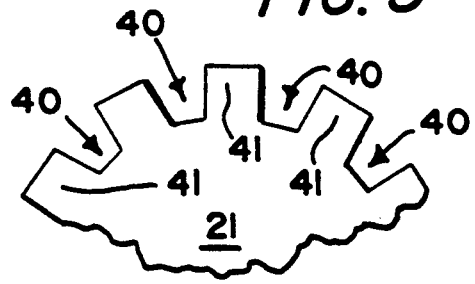
FIG. 5 is a side view of the slotted thrust plate of FIG. 4.

Slotted second thrust plate 21 is formed of a ferromagnetic material and induces a change in a magnetic field which is measured by sensor element or detector 22. Detector 22 is preferably either a variable reluctance or Eddy current detector. The relationship between detector 22 and slotted second thrust plate 21 is set forth in FIG. 4. FIG. 5 is a partial side view of slotted second thrust plate 21 and depicts slots 40 disposed between teeth 41.

Figure 6:
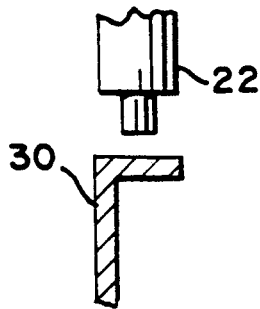
FIG. 6 is an enlargement of area A' in FIG. 3 depicting a variable reluctance detector and a slotted thrust plate with angled teeth.
Figure 7:
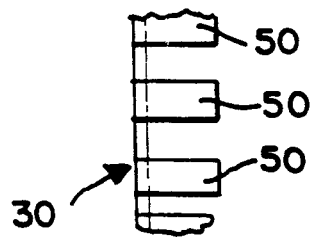
FIG. 7 is a top planar view of the slotted thrust plate having angled teeth of FIG. 6.
Figure 8:
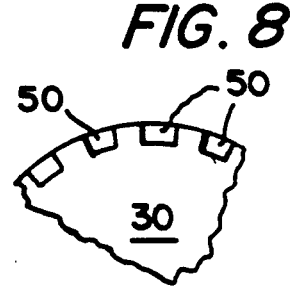
FIG. 8 is a side view of the slotted thrust plate having angled teeth of FIG. 7.
Figure 3:
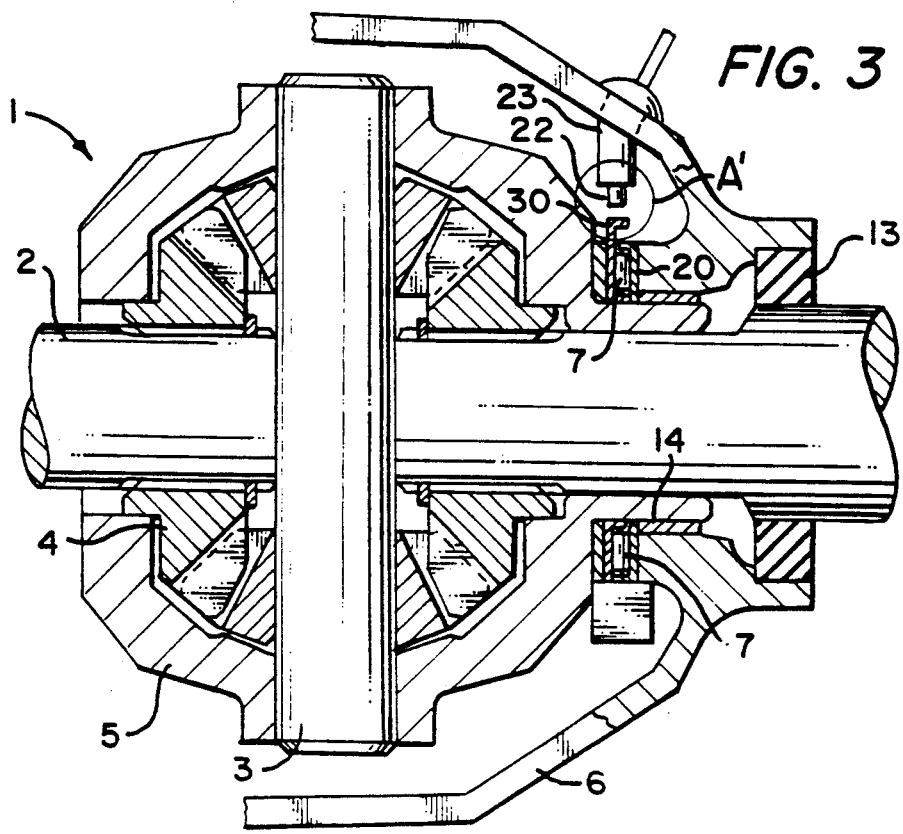
FIG. 3 is a schematic cross-sectional view of another embodiment according to the present invention wherein a slotted thrust plate includes angled teeth.

As shown in FIG. 3, slotted second thrust plate 30 can optionally include teeth which are angled away from detector 22. This is thought to enhance the detection of the magnetic field as slotted second thrust plate 30 passes detector 22. FIG. 6 demonstrates the relationship between detector 22 and slotted second thrust plate 30, having angled teeth. FIG. 7 is a top planar view of slotted second thrust plate 30 of FIG. 6 and depicts angled teeth 50. FIG. 8 is a partial side view of slotted second thrust plate 30 of FIG. 7 which shows angled teeth 50.

Sometimes the thrust race may not be made of an optimal ferromagnetic material and its inherent dimensions may not be optimal for inducing change in the magnetic field. In order to optimize a thrust race for sensing performance, a material of superior ferromagnetic characteristics and dimensions may be attached to the thrust plate.

In addition to the preferred embodiment described above, the present invention is applicable to any power transmission device which uses thrust bearings. For example, the thrust bearing on the input shaft of a torque convertor can be modified to incorporate the elongated thrust plate 9 of the present invention. Other applications include power take-off units, four wheel drive transfer cases and differentials. The present invention is also applicable to any intermediate shafts within the power transmission device which use thrust bearings on the intermediate shaft.

While I have shown and described several embodiments in accordance with my invention, it is to be clearly understood that the same are susceptible to numerous changes and modifications apparent to one skilled in the art. Therefore, I do not wish to be limited to the details shown and described but intend to show all changes and modifications which come within the scope of the appended claims.

Having described the invention, what is claimed is:

1. A thrust bearing sensor used in detecting the speed of a shaft in a power transmission device, said transmission device comprising a transmission shaft, a transmission housing, and a thrust bearing assembly disposed about said transmission shaft and having a thrust bearing disposed between a first thrust plate and a second thrust plate which is relatively rotatable with respect to the first thrust plate, the improvement characterized by:

said second thrust plate being elongated such that it provides a raceway for said thrust bearing and is also capable of supporting at a radial portion thereof a means for permanently providing a magnetic field; and a sensor element disposed opposite the means for permanently providing a magnetic field for detecting the magnetic field.

2. The thrust bearing sensor of claim 1 wherein the sensor element is a Hall-effect detector.

3. The thrust bearing sensor of claim 1 wherein the means for permanently providing a magnetic field is a plurality of permanently magnetized magnetic pole segments disposed about a radial portion of said second thrust plate.

4. The thrust bearing sensor of claim 3 wherein each magnetic pole segment has a North pole and a South pole, with the segments being arranged so that each pole is between two poles of opposite polarity.

5. A thrust bearing sensor used in detecting the output speed of a transmission device which comprises a transmission shaft, a differential member, differential gears, a differential casing, a transmission housing, and a thrust bearing assembly disposed about said transmission shaft and having a thrust bearing disposed between a first thrust plate and a second thrust plate which is relatively rotatable with respect to the first thrust plate, the improvement characterized by:

said second thrust plate being elongated such that it provides a raceway for said thrust bearing and is also capable of supporting at a radial portion thereof a means for permanently providing a magnetic field; and a sensor element disposed opposite the means for permanently providing a magnetic field for detecting the magnetic field.

6. The thrust bearing sensor of claim 5 wherein the sensor element is a Hall-effect detector.

7. The thrust bearing sensor of claim 5 wherein the means for permanently providing a magnetic field is a plurality of permanently magnetized magnetic pole segments disposed about a radial portion of said second thrust plate.

8. The thrust bearing sensor of claim 7 wherein each magnetic pole segment has a North pole and a South pole, with the segments being arranged so that each pole is between two poles of opposite polarity.

* * * * *